Figure 1:
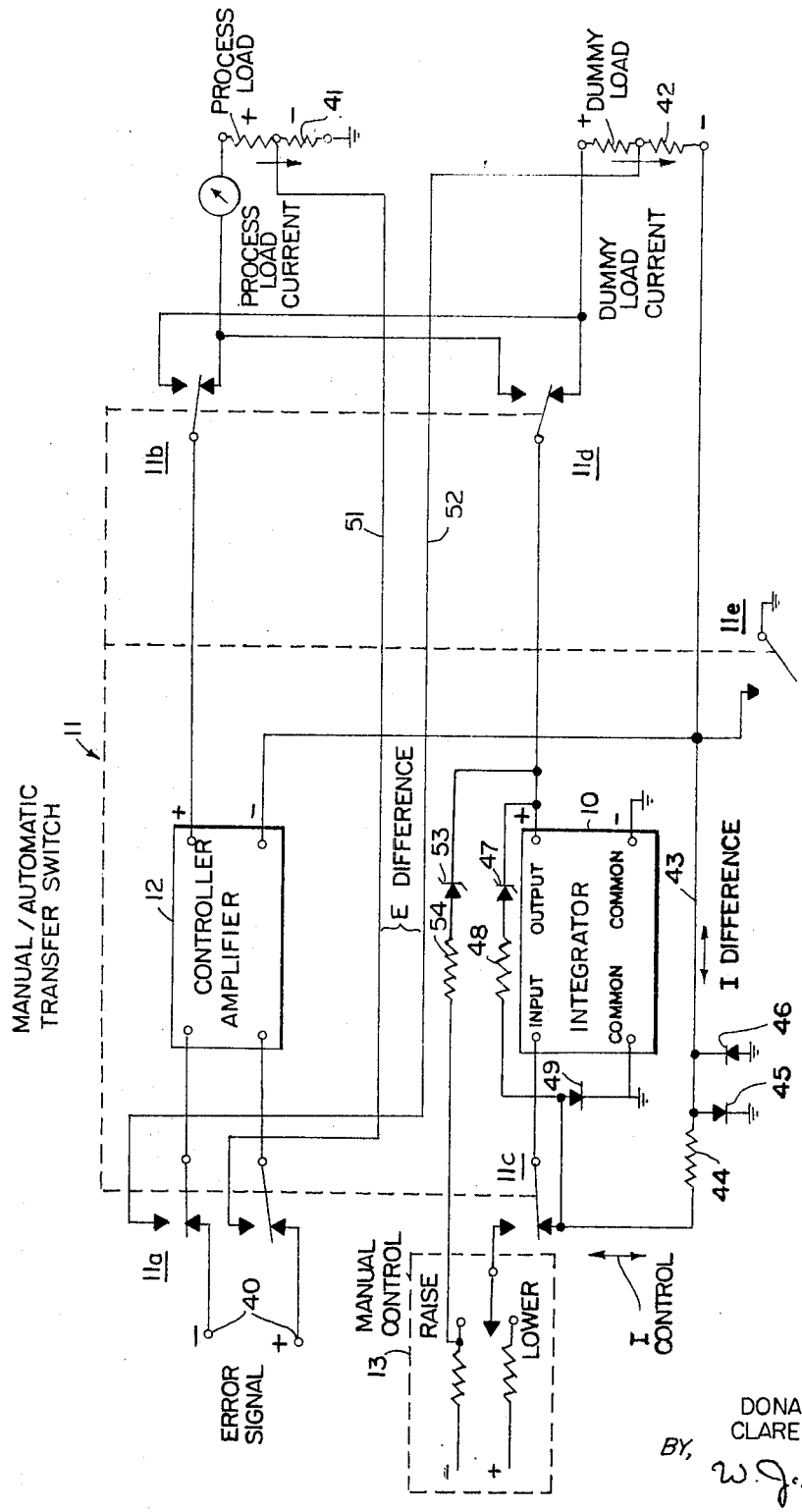

United States Patent Office 3,290,563
Patented Dec. 6, 1966

3,290,563
SELF-SYNCHRONIZING CONTROLLER WITH AUXILIARY LOAD MEANS FOR "BUMPLESS" TRANSFER BETWEEN MANUAL AND AUTOMATIC MODES
Donald R. Hyer, Lynnfield, Mass., and Clarence W. Hewlett, Jr., Hampton, N.H., assignors to General Electric Company, a corporation of New York
Filed July 31, 1964, Ser. No. 386,590
15 Claims. (Cl. 317—231)

This invention relates to self-synchronized process controllers, and more particularly to a new and improved type of self-synchronized process controller which utilizes an integrating device capable of being electrically read out.

Self-synchronization is provided in process controllers to prevent the occurrence of a "bump" in the process load current when the controller is transferred between its automatic and its manual modes of operation. These types of controllers are utilized in those applications in which it is necessary to automatically prevent a disruption in the process load current during transfer from automatic to the manual mode of operation as distinguished from conventional manual balancing during transfer. Self-synchronization has commonly been accomplished in prior art controllers by utilizing electromechanical servo systems which cause the manual control signal to automatically follow the control signal present at the output of the controller when the controller is in its "automatic" mode of operation.

More recently, a self-synchronizing controller having no movable components has been developed. This controller utilizes an electrical readout integrating device in cooperation with the controller amplifier, manual control signal source, and mode transfer switch. In such systems, control of the process load current is accomplished by connecting the output circuit of the integrating device to the process load so that it will supply the process load current. The output of the controller is coupled to the process load in a manner such that a current will be generated which is equal to the difference between the current flowing in the process load and the controller output current. The mode control switch is then utilized to selectively apply this difference current to either the input of the controller or the input of the integrating device.

Manual control is accomplished in such systems by connecting the manual control signal source to the input of the integrating device, while the difference current is applied to the input of the controller amplifier to cause the output of the controller to a dummy load to follow the process load current.

Automatic control is obtained by connecting the input error signal; i.e., the signal equal to the difference between the measured variable and the set point voltage, to the input of the controller while the difference current is applied to the input of the integrating device. This causes the output current of the integrating device; i.e., the process load current, to follow the output current of the controller. Thus, it can be seen that the process load current is generated in the output circuit of the integrating device in response to difference current signals applied to the input of the integrating device. While this configuration is entirely satisfactory for applications in which the controller does not have to exhibit a high frequency response; e.g., >1 c.p.s., it is clearly not adequate for those controller applications which require frequency responses greater than the frequency response of presently available integrating devices; e.g., 25 c.p.s.

It is therefore an object of this invention to provide a new and improved self-synchronizing controller of the type utilizing integrating devices of the electrical readout type.

It is another object of this invention to provide a new and improved self-synchronizing controller in which the frequency response of the electrical readout indicating device does not act as a limitation upon the frequency response of the controller.

Figure 2:
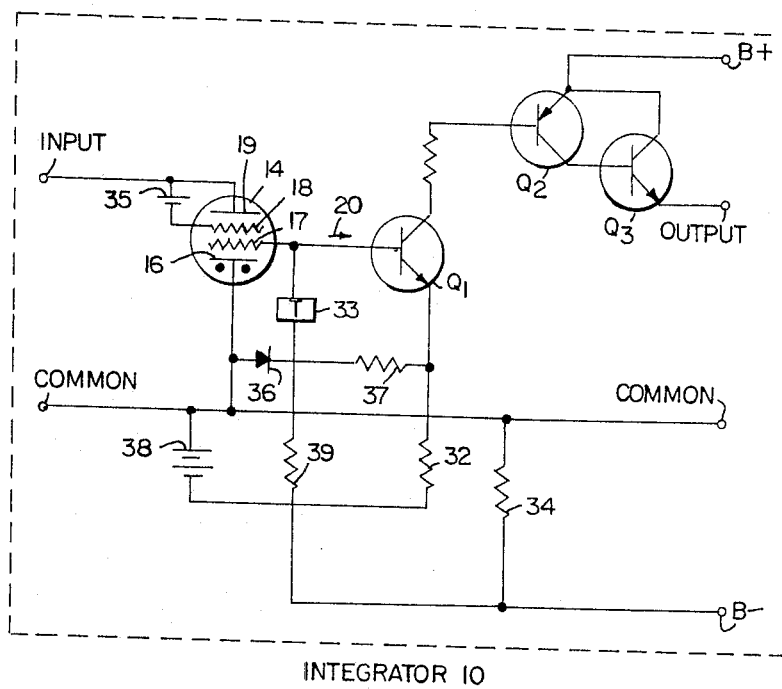

These and other objects and advantages of this invention may best be understood by reference to the following description taken in conjunction with the accompanying drawings in which:

FIG. 1 is a schematic representation of the preferred embodiment of this invention; and FIG. 2 is a schematic representation of the integrator device of FIG. 1.

In accordance with this invention, a self-synchronizing controller of the type utilizing an electrical readout integrating device and having a frequency response which is independent of the frequency response of the integrating device is provided. This is accomplished when the controller is in its automatic mode of operation by connecting the process load across the controller amplifier and by connecting a dummy load across the output of the integrating device. Two currents are then produced with one current representing the process load current and the setting of the controller amplifier while the other current represents the dummy load current and the setting of the integrating device. Means are provided for comparing these two currents and producing a polarized output signal which is applied to the input of the integrating device to cause the dummy load current to follow the process load current. Thus, when in its automatic mode of operation, a current operated servo system is provided to cause the output current of the integrating device to follow the process load current at all times thus permitting the connection of the output of the integrating device to the process load without causing a disruption in the process load current.

Frequency response of the controller in accordance with the invention is thus no longer dependent upon the frequency response of the solion when it is in its "automatic" mode since the controller output current is directly applied to the process load rather than being applied through the integrating device as was the case with the prior art controller in which the process load is connected in the output circuit of the integrating device.

Referring now to FIG. 1, we have illustrated the basic form of the invention. Electrical readout INTEGRATOR 10 cooperates with MANUAL/AUTOMATIC TRANSFER SWITCH 11, CONTROLLER AMPLIFIER 12, and MANUAL CONTROL 13 to provide means for self-synchronizing a controller to accomplish bumpless transfer between manual and automatic control.

Referring now to FIG. 2, INTEGRATOR 10 is comprised of solion 14 and three stages of amplification provided by transistors Q1, Q2, and Q3, to thus provide a signal current flowing between the OUTPUT and COMMON terminals which is proportional to the integral of the signals applied between the INPUT and COMMON terminals.

Solions which are recognized as being capable of functioning as an electrical readout integrator are four electrode electrochemical cells which contain an electrolyte for permitting the passage of a current to be integrated between an input electrode and a common electrode. The electrolytic solution utilized is a solution of a reversible redox system; i.e., a system in which the ionic conduction between two electrodes results in the reduction of one species of the ions in solution at one of the electrodes and the corresponding oxidation of the other species of the ion at the other electrode of the system so that there is no net change in contents of the cell.

When solions are utilized as current integrating devices such as described and claimed in the application of Clarence W. Hewlett, Jr., Serial No. 323,795, "System for Sampling and Storing Information" filed November 14, 1963, and assigned to the same assignee as the present invention, the passage of current between the input and common electrodes changes the quantity of the measured species in what has been termed the integral compartment. The readout electrode, which is located in the integral compartment along with the common electrode, is utilized to indicate the concentration of the measured species in the integral compartment by permitting the passage of the readout current between the readout and common electrodes. The magnitude of the resulting readout current will indicate such concentration in the integral compartment. Consequently, the magnitude of the readout current will be proportional to the charge transferred between the input and common electrodes and thus the solion will perform the desired integration function.

Solion 14 is illustrated as comprising a cell containing an electrolyte in which there is immersed a common electrode 16, a readout electrode 17, a shield electrode 18, and an input electrode 19. These electrodes are formed of a metal which is inert in the electrolyte. For example, platinum electrodes have been commonly used with an electrolyte formed of an aqueous solution containing a small amount of iodine and a comparatively large amount of potassium or sodium-iodide. This results in a solution containing iodide ions and tri-iodide ions, the latter of which will hereinafter be referred to as iodine. In such a redox system, iodine becomes the measured species of the ions of the solution.

Further information concerning the manner of construction or theory of operation of solion 14 is not felt to be necessary for a complete understanding of the invention. It suffices here to say that solion 14 will provide an output current which flows in the direction indicated by arrow 20 between readout electrodes 17 and common electrode 16 and is proportional to the integral of the current passed between input electrode 19 and common electrode 16 so that the readout current remains at a level determined by the last applied input signal to the solion 14 when the input signal is suddenly removed.

The amplifier formed by transistors Q1, Q2, and Q3 provides means for amplifying the readout current of solion 14 so that currents as large as the maximum desired process load current can be supplied by INTEGRATOR 10 at its OUTPUT terminal. For example, if the controller is to provide currents within the range of 10–50 ma., INTEGRATOR 10 must be capable of supplying such currents at its OUTPUT. Resistor 34, which carries the current flowing at OUTPUT terminal, provides a signal that varies with integrator output current. This signal is applied to the input of the amplifier; i.e., the base of transistor Q1, through the negative feedback network comprising negative temperature coefficient resistor 33 and resistor 39. Resistor 33 is provided to compensate for variations in output current 20 with temperature variations of solion 14.

As is well known in the prior art, the electrochemical redox system of a solion must be completely reversible in order for it to accurately perform its integrating function. This will obtain as long as the applied voltages stay below the potential at which other ions enter into the reaction at the electrodes. Furthermore, such reactions must be avoided to prevent the generation of a gaseous by-product, the pressure of which would destroy the cell. This requires the selection of proper bias voltages and the limiting of the magnitude of the voltages applied to the solion.

The bias voltage requirements of solion 14 require the shield and readout electrodes 18 and 17 to be negatively biased like amounts with respect to the input and common electrodes, respectively. Bias battery 35 provides means for negatively biasing shield electrode 18 with respect to input electrode 19, while means is provided by the drop across diode 36 and resistance 37 to fix the operating point of readout electrode 17 so that it is negative a corresponding amount with respect to common electrode 16. This is accomplished by connecting diode 36 and resistor 37 in the bleeder network which includes resistor 32 and battery 38. The voltage developed across diode 36 and resistor 37 is applied across the base-emitter junction of transistor Q1 and the output circuit of solion 14 to provide the required net bias for readout electrode 17. Bias voltages of —.3 volt have been found to provide proper bias for shield electrode 18 and readout electrode 17.

*Automatic mode*

Referring now to FIG. 1, input terminals 40, which are connected to a source of error signals (not illustrated), are connected to the input of CONTROLLER AMPLIFIER 12 when section 11a of switch 11 is in the illustrated "automatic" position. Means is provided by switch section 11b of switch 11 to connect the PROCESS LOAD between the positive terminal of CONTROLLER AMPLIFIER 12 and ground through resistor 41. Resistor 41, which may conveniently be centrally located at the controller, is provided for generating the required voltage difference signals necessary in the manual mode of operation as will hereinafter be discussed. Resistor 42, which is in series with the DUMMY LOAD also serves a like purpose.

The negative terminal of CONTROLLER AMPLIFIER 12 is connected to the DUMMY LOAD through resistor 42 while the positive terminal of the DUMMY LOAD is connected to the OUTPUT terminal of INTEGRATOR 10 via switch section 11d when TRANSFER SWITCH 11 is in its illustrated "automatic" position. The circuit is completed through the ground return path to COMMON terminal of INTEGRATOR 10.

In view of the indicated polarities of the outputs of INTEGRATOR 10 and AMPLIFIER 12 and their manner of interconnection in the circuit and oppositely polarized diodes 45 and 46 which are connected between conductor 43 and ground, a current equal to the difference between the PROCESS LOAD CURRENT and the DUMMY LOAD CURRENT will flow in conductor 43 through resistor 44 to the INPUT terminal of INTEGRATOR 10 when switch section 11c is in the illustrated "automatic" position. The difference current flowing in conductor 43 is constituted by two current components. In the "automatic" mode a first component is provided by the CONTROLLER AMPLIFIER 12 and current is conducted from the positive terminal of the CONTROLLER AMPLIFIER 12 through the switch section 11b, the process load current meter, the PROCESS LOAD, resistor 41, ground, diode 46, conductor 43 and then to the negative terminal of the CONTROLLER AMPLIFIER 12. Similarly, a second current component flows from the output terminal of the INTEGRATOR 10 through the switch section 11d, the DUMMY LOAD, resistor 42, conductor 43, diode 45 and ground to return to the common terminal of INTEGRATOR 10. Thus, when the controller is stabilized and in the "automatic" mode of operation, the ERROR SIGNAL applied to terminals 40 is connected to the input of CONTROLLER AMPLIFIER 12 and effective PROCESS LOAD CURRENT flows from the positive to the negative terminal of AMPIFIER 12 through switch section 11b, the PROCESS LOAD, resistor 41, ground, the output circuit of INTEGRATOR 10, switch section 11d, DUMMY LOAD and resistor 42.

It can be seen that if the PROCESS LOAD CURRENT is equal to the DUMMY LOAD CURRENT, the effective current flowing in conductor 43 will be zero. If, however, the PROCESS LOAD CURRENT is larger than the DUMMY LOAD CURRENT, current will be taken from the INPUT terminal of INTEGRATOR 10 to increase the DUMMY LOAD CURRENT. This current will continue to be extracted from the input of INTEGRATOR 10 until the DUMMY LOAD CURRENT equals the PROCESS LOAD CURRENT in which case no further current will flow through conductor 43. If, however, the PROCESS LOAD CURRENT is smaller than the DUMMY LOAD CURRENT, current will then be added to the INPUT terminal of INTEGRATOR 10 to decrease the DUMMY LOAD CURRENT. Thus, the outputs of CONTROLLER AMPLIFIER 12 and INTEGRATOR 10 are polarized so that the difference current appearing on conductor 43 will cause the output current of the INTEGRATOR 10 to follow the output current of AMPLIFIER 12 when the controller is on "automatic."

Oppositely polarized diodes 45 and 46, which are connected between conductor 43 and ground, are chosen to provide means for preventing the potential of conductor 43 from making excessive swings in potential with respect to the potential across the PROCESS LOAD which would result in the voltages developed in the servo system having an adverse effect upon the control action; in addition diodes 45 and 46 provide current return paths for the PROCESS LOAD CURRENT and the DUMMY LOAD CURRENT. Resistance 44, which is connected in series with the input of INTEGRATOR 10 when on automatic control thus controls, in cooperation with diodes 45 and 46, the maximum magnitude of current that can be applied to the INPUT of INTEGRATOR 10. Thus, resistor 44 governs the rate at which the INTEGRATOR can follow the AMPLIFIER to prevent it from following it into a malfunction situation before the controller is switched to manual. It also provides means for controlling the gain of the feedback loop to prevent instability when the solion is cold.

Zener diode 47 and resistor 48 provide means for feeding back current, when transfer switch 11 is in its "automatic" position, from the OUTPUT of the integrator to its INPUT whenever the current flowing at the OUTPUT terminal exceeds a given value; for example, 50 ma. when the range of controller operation is from 10–50 ma. Assuming a 600 ohms process load, this means that Zener diode 47 should break down when the OUTPUT terminal exceeds 30 v. This prevents the solion from being overdriven; i.e., driven into saturation if, for some reason, the potential of the OUTPUT terminal exceeds 30 volts.

Diode 49, which is connected directly in shunt with the input of INTEGRATOR 10 by switch section 11c provides means for limiting the magnitude of the voltage appearing between the INPUT and COMMON terminals of INTEGRATOR 10 to protect the solion from inadvertent application of voltages which might destroy the cell. For example, destructive voltages can be applied if the output circuit of the controller is accidentally opened, thus resulting in the direct application of B+ to the OUTPUT terminal through transistors Q3. Diode 49, which is in the nature of a back-up protector for solion 14 is designed to limit the voltage to ±.3 volt to prevent damage due to other ions entering into the reaction at the electrodes.

*Manual mode*

Assuming now that TRANSFER SWITCH 11 is placed in its manual position, switch section 11e connects resistor 42 to ground completing the circuit for obtaining the difference voltage appearing across resistors 41 and 42. Switch 11a serves to connect this difference voltage, which appears between conductors 51 and 52, to the input of CONTROLLER AMPLIFIER 12 while switch sections 11b and 11d connect the DUMMY LOAD and the PROCESS LOAD to the outputs of CONTROLLER AMPLIFIER 12 and INTEGRATOR 10, respectively. At the same time, switch section 11c disconnects the INPUT of INTEGRATOR 10 from difference current conductor 43, the feedback network, and diode 49, and connects it to MANUAL CONTROL 13 which selectively provides voltages equal to or less than ±.3 v. Thus, the integrator is now under manual control at a time when its output is connected directly across the process load. When in this condition, the CONTROLLER AMPLIFIER output will be made to follow the process load current output due to the application to its input of the difference potential appearing between conductors 51 and 52.

The manual feedback network, which is comprised of Zener diode 53 and resistor 54, serves, during the manual mode of operation, to protect solion 14 from the failure of the operator to release the spring-biased switch from its RAISE position when the output of INTEGRATOR 10 exceeds 50 ma. If this condition were permitted to exist for too long a length of time, it would cause the integral compartment of solion 14 to become saturated with iodine and would result in excessive time to restore normal operation. Thus, Zener diode 53 will also break down at 30 volts, assuming a maximum output current of 50 ma. and a load of 600 ohms.

To summarize, the frequency response of solions commonly in use, which normally is of the order of 1 c.p.s., is no longer a limiting factor preventing their use for self-synchronization purposes in controllers having a considerably higher frequency response; e.g., 25 c.p.s., since in accordance with this invention, the process load is directly connected in the output circuit of the controller amplifier when the controller is in its automatic mode. Therefore, the process load current is supplied by the controller amplifier instead of by the amplified output of a solion.

While there has been described what is at present considered to be a preferred embodiment of the invention, it will be apparent to those skilled in the art that various changes and modifications may be made therein without departing from the spirit or scope of the invention.

What we claim as new and desire to secure by Letters Patent of the United States is:

1. A system for synchronizing a controller which is capable of automatic and manual control to prevent the disruption of the controlled process when switching between its automatic and manual modes of operation comprising signal amplifying means for providing an output signal proportional to signals applied to the input thereof,
   signal integrating means including means for providing an output signal which is proportional to the integral of signals applied to the input of said signal integrating means,
   a process load electrically coupled to and energized by the output of said signal amplifying means,
   a dummy load electrically coupled to and energized by the output of said signal integrating means,
   a source of error signals,
   means for connecting said error signal source to the input of said signal amplifying means,
   means for obtaining a difference current which is proportional to the difference between the currents of said process load and said dummy load, and
   means for applying said difference current to the input of said signal integrating means in a polarity for equalizing the output current of said signal integrating means with the output current of said signal amplifying means.

2. The combination of claim 1 further comprising means for feeding current back from the output of said signal integrating means to the input thereof whenever its output current exceeds a given value, said feedback current being of the proper polarity to cause said output current to decrease.

3. The combination of claim 2 further comprising means connected to said difference current applying means for limiting its potential to a value that will not interfere with proper controller action.

4. The combination of claim 3 in which said difference current applying means comprises a resistance connected in series with the input of said signal integrating means for controlling the speed with which the output current of said signal integrating means equalizes with the output current of said signal amplifying means.

5. The combination of claim 4 further comprising means connected in shunt with the input of said signal integrating means for limiting the potential that may be applied to said input to prevent the accidental application of destructive voltages thereto.

6. The combination of claim 5 in which said feedback means comprises a Zener diode connected to said output, the potential of said output exceeding the breakdown potential when the output current exceeds the normal maximum output current.

7. A system for synchronizing a controller which is capable of automatic and manual control to prevent the disruption of the controlled process when switching between its automatic and manual modes of operation comprising signal amplifying means for providing an output signal proportional to signals applied to the input thereof,
    signal integrating means including means for providing an output signal which is proportional to the integral of signals applied to the input of said signal integrating means,
    a process load electrically coupled to and energized by the output of said signal integrating means,
    a dummy load electrically coupled to and energized by the output of said signal amplifying means,
    means for selectively providing a positive or a negative potential,
    means for connecting the selected potential to the input of said signal integrating means,
    means for obtaining a difference voltage which is proportional to the difference in voltage across said process and said dummy loads and means for applying said difference voltage across the input of said signal amplifying means, said difference voltage being of a polarity for equalizing the output of said signal amplifying means with the output of said signal integrating means.

8. The combination of claim 7 further comprising means for feeding current back from the output of said signal integrating means to the input thereof whenever its output exceeds a given value while said input is connected to the selected potential which is of the proper polarity to cause said output current to rise.

9. The combination of claim 8 in which said signal integrating means comprises an electrochemical cell for providing an output signal proportional to the integral of signals applied to the input of said signal integrating means, said cell being responsive to the connection of its input to a negative potential to cause its output current to increase,
    said current feedback means being connected to the input of said cell when said negative potential is selected for connection.

10. A system for synchronizing a controller which is capable of automatic and manual control to prevent the disruption of the controlled process when switching between its automatic and manual modes of operation comprising a signal amplifying means for providing an output signal proportional to signals applied to the input thereof,
    signal integrating means including means for providing an output signal which is proportional to the integral of signals applied to the input of said signal integrating means,
    a process load,
    a dummy load,
    a source of error signals,
    means for selectively providing a positive or a negative potential,
    means including a first switching means for obtaining a current which is proportional to the difference in magnitude of the currents flowing in said process and said dummy loads when said first switching means is in a first condition,
    means including said first switching means for obtaining a voltage which is proportional to the difference in magnitude of the voltages across said process and said dummy loads when said first switching means is in its second condition,
    second switching means for connecting said error signal source and said difference voltage means to the input of said signal amplifying means when in first and second conditions, respectively,
    third switching means for connecting said process load and said dummy load to the output of said signal amplifying means when in first and second conditions, respectively,
    fourth switching means for connecting said difference current means and said selective potential means to the input of said signal integrating means when in first and second conditions, respectively, the current from said difference current means being of a polarity for equalizing the output of said signal integrating means with the output of said amplifying means,
    fifth switching means for connecting said dummy load and said process load to the output of said signal integrating means when in first and second conditions, respectively,
    and means for simultaneously operating said switching means to their corresponding conditions to control the mode of controller operation.

11. The combination of claim 10 further comprising means connected to said difference current means for limiting its potential to a value that will not interfere with proper controller action when said fourth switching means is in said first condition.

12. The combination of claim 11 further comprising means for feeding current back from the output of said signal integrating means to the input thereof whenever its output current exceeds a given value while said third switching means is in said first condition, said feedback current being of the proper polarity to cause said output current to decrease.

13. The combination of claim 12 further comprising means connected in shunt with the input of said signal integrating means when said fourth switching means is in said first condition for limiting the potential that may be applied to said input to prevent the accidental application of destructive voltages thereto.

14. The combination of claim 10 further comprising means for feeding current back from the output of said signal integrating means to the input thereof when said fourth switching means is in said second condition and said selected potential is negative,
    said feedback means being operative only when said output current exceeds a given value, the output current of said signal integrating means increasing when a negative potential is applied to its input.

15. The combination of claim 14 in which said feedback means comprises a Zener diode connected to said output, the potential of said output exceeding the breakdown potential when the output current exceeds the normal maximum output current.

References Cited by the Examiner
UNITED STATES PATENTS
3,246,250   4/1966   Nazareth _____ 330—10

JOHN W. HUCKERT, *Primary Examiner.*

J. D. KALLAM, *Assistant Examiner.*